United States Patent
Kim et al.

(10) Patent No.: US 11,017,202 B2
(45) Date of Patent: May 25, 2021

(54) FINGERPRINT VERIFICATION METHOD AND ELECTRONIC DEVICE PERFORMING SAME

(71) Applicant: Samsung Electronics Co., Ltd., Suwon-si (KR)

(72) Inventors: Sun A Kim, Suwon-si (KR); Jeong Hoo Kim, Suwon-si (KR); Seung Geol Baek, Suwon-si (KR); Kyung Hoon Song, Suwon-si (KR); Kwang Sub Lee, Suwon-si (KR); Gyu Sang Cho, Suwon-si (KR); Yun Jang Jin, Suwon-si (KR); Yong Seok Kim, Suwon-si (KR); Valeriy Prushinskiy, Suwon-si (KR); Se Young Jang, Suwon-si (KR); Chang Ryong Heo, Suwon-si (KR); Suk Hyun, Suwon-si (KR); Young Il Shin, Suwon-si (KR); Hyeong Wook Yang, Suwon-si (KR); Tushar Balasaheb Sandhan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/204,809

(22) Filed: Nov. 29, 2018

(65) Prior Publication Data
US 2019/0188448 A1 Jun. 20, 2019

(30) Foreign Application Priority Data

Dec. 20, 2017 (KR) .......................... 10-2017-0176388

(51) Int. Cl.
*G06K 9/00* (2006.01)
*G06K 9/03* (2006.01)
(Continued)

(52) U.S. Cl.
CPC ......... *G06K 9/00073* (2013.01); *G06F 21/32* (2013.01); *G06K 9/0004* (2013.01);
(Continued)

(58) Field of Classification Search
CPC ............. G06K 9/00053; G06K 9/0008; G06K 9/00067; G06F 21/32
See application file for complete search history.

(56) References Cited

U.S. PATENT DOCUMENTS

| 9,471,765 B1 | 10/2016 | Setterberg et al. |
| 2003/0068072 A1* | 4/2003 | Hamid ................. G06K 9/0002 382/124 |

(Continued)

FOREIGN PATENT DOCUMENTS

| CN | 106127481 A | 11/2016 |
| KR | 10-2005-0013764 A | 2/2005 |

(Continued)

OTHER PUBLICATIONS

International Search Report dated Feb. 28, 2019, issued in the International Application No. PCT/KR2018/015048.
(Continued)

*Primary Examiner* — John J Lee
(74) *Attorney, Agent, or Firm* — Jefferson IP Law, LLP

(57) ABSTRACT

An electronic device is provided. The electronic device includes a transparent member, a display positioned under a transparent member that includes a plurality of pixels, an image sensor positioned under some areas of the display, a memory, and a processor. The processor obtains a first image at least based on light output through at least some of the plurality of pixels and reflected by an external object coming into contact with the transparent member using the image sensor, performs authentication on the external object at least based on the at least one template using the first image,
(Continued)

generates a second image of the external object at least based on the first image when quality of the first image corresponds to a given condition based on a result of the authentication, and performs authentication on the external object at least based on the at least one template using the second image.

20 Claims, 17 Drawing Sheets

(51) Int. Cl.
    *G06F 21/32*     (2013.01)
    *G06K 9/40*     (2006.01)

(52) U.S. Cl.
    CPC ..... *G06K 9/00053* (2013.01); *G06K 9/00067* (2013.01); *G06K 9/00926* (2013.01); *G06K 9/036* (2013.01); *G06K 9/40* (2013.01); *G06K 9/0008* (2013.01)

(56) References Cited

U.S. PATENT DOCUMENTS

| | | |
|---|---|---|
| 2004/0160335 A1 | 8/2004 | Reitmeier |
| 2008/0253626 A1 | 10/2008 | Shuckers et al. |
| 2012/0013436 A1 | 1/2012 | Niinuma |
| 2012/0047574 A1 | 2/2012 | Kim et al. |
| 2015/0067827 A1 | 3/2015 | Lim et al. |
| 2015/0137938 A1 | 5/2015 | Slaby et al. |
| 2015/0278574 A1 | 10/2015 | Boshra |
| 2016/0078274 A1 | 3/2016 | Tuneld et al. |
| 2016/0171280 A1 | 6/2016 | Han et al. |
| 2016/0277930 A1* | 9/2016 | Li .................. H04L 63/083 |
| 2017/0124316 A1 | 5/2017 | Slaby et al. |
| 2017/0124370 A1 | 5/2017 | He et al. |
| 2017/0200043 A1* | 7/2017 | Wu .................. G06K 9/00087 |
| 2017/0300736 A1* | 10/2017 | Song .................. G06K 9/0004 |
| 2018/0075277 A1 | 3/2018 | Lee |

FOREIGN PATENT DOCUMENTS

| | | |
|---|---|---|
| KR | 10-0763312 B1 | 10/2007 |
| KR | 10-2012-0018685 A | 3/2012 |
| KR | 10-2015-0027329 A | 3/2015 |
| KR | 10-1596298 B1 | 2/2016 |
| WO | 2017/070711 A1 | 4/2017 |

OTHER PUBLICATIONS

Extended European Search Report dated Apr. 26, 2019, issued in the European Application No. 18209563.8.
Yuanbao Wu et al, A Fast Fingerprint Identification Pre-Processing Algorithm, Proceedings of ICBBE 2007, IEEE, Piscataway, NJ, USA, Jul. 1, 2007 (Jul. 1, 2007), pp. 596-598, XP031116125, ISBN: 978-1-4244-1120-7.
Jucheng Yang et al, Two-Stage Enhancement Scheme for Low-Quality Fingerprint Images by Learning From the Images, IEEE Transactions on Human-Machine Systems, IEEE, Piscataway, NJ, USA, vol. 43, No. 2, Mar. 1, 2013 (Mar. 1, 2013), pp. 235-248, XP011494973, ISSN: 2168-2291, DOI: 10.1109/TSMCC.2011. 2174049.
Olsen Martin Aastrup et al, Fingerprint skin moisture impact on biometric performance, 3rd International Workshop on Biometrics and Forensics (IWBF 2015), IEEE, Mar. 3, 2015 (Mar. 3, 2015), pp. 1-6, XP032779934, DOI: 10.1109/IWBF.2015.7110223 [retrieved on May 18, 2015].
Rahmat Syam et al, Determining the Dry Parameter of Fingerprint Image Using Clarity Score and Ridge-valley Thickness Ratio, IAENG International Journal of Computer Science, 38:4, IJCS_38_ 4_04 (Advance online publication: Nov. 12, 2011), Nov. 12, 2011 (Nov. 12, 2011), XP55577561, Retrieved from the Internet: URL:http:// www.iaeng.org/IJCS/issues_v38/issue_4/IJCS_38_4_04.pdf [retrieved on Apr. 4, 2019].
European Office Action dated Jan. 9, 2020, issued in the European Application No. 18 209 563.8.

* cited by examiner 0                                              255

0                              255

FINGERPRINT VERIFICATION METHOD AND ELECTRONIC DEVICE PERFORMING SAME

CROSS-REFERENCE TO RELATED APPLICATION(S)

This application is based on and claims priority under 35 U.S.C. § 119(a) of a Korean patent application number 10-2017-0176388, filed on Dec. 20, 2017, in the Korean Intellectual Property Office, the disclosure of which is incorporated by reference herein in its entirety.

BACKGROUND

1. Field

The disclosure relates to a method of performing authentication using a fingerprint in an electronic device and an apparatus supporting the same.

2. Description of Related Art

An electronic device can perform various functions complexly. For example, a mobile communication terminal, a personal digital assistant (PDA), an electronic wallet, a smartphone or a tablet personal computer (PC) is developed to provide a user with more convenience while implementing advanced performance.

A given one of functions provided by the electronic device may be provided only when a user's authentication is performed by taking a security problem into consideration. For example, the electronic device may support a fingerprint authentication function to provide a given function depending on whether a user's fingerprint is identical with preset information.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method an electronic device supporting fingerprint recognition through which such a recognition error does not occur.

When fingerprint authentication is performed in an electronic device, it may not be performed depending on the state of a fingerprint although the fingerprint authentication is performed based on the same fingerprint of the same user.

For example, although fingerprint registration and fingerprint authentication are performed based on a fingerprint of the same user, when the fingerprint authentication is performed, an authentication error may occur because an electronic device recognizes the fingerprint of the same user as a fingerprint of a different user if a dry degree, degree of contained oil or temperature state of a corresponding finger of the same user is different from the fingerprint state when the fingerprint registration was performed.

Additional aspects will be set forth in part in the description which follows and, in part, will be apparent from the description, or may be learned by practice of the presented embodiments.

In accordance with an aspect of the disclosure, an electronic device is provided. The electronic device includes a transparent member, a display positioned under a transparent member and configured to include a plurality of pixels, an image sensor positioned under at least some area of the display, a memory configured to store at least one template, and a processor. The processor may be configured to obtain a first image at least based on light output through at least some of the plurality of pixels and reflected by an external object coming into contact with the transparent member using the image sensor, perform authentication on the external object at least based on the at least one template using the first image, generate a second image of the external object at least based on the first image when quality of the first image corresponds to a given condition based on a result of the authentication, and perform authentication on the external object at least based on the at least one template using the second image.

In accordance with another aspect of the disclosure, an electronic device is provided. The electronic device includes a transparent member, a display positioned under a transparent member and configured to include a plurality of pixels, an image sensor positioned under at least some area of the display, a memory configured to store at least one template, and a processor. The processor may be configured to obtain a first image at least based on light output through at least some of the plurality of pixels and reflected by an external object coming into contact with the transparent member using the image sensor, determine quality of the first image at least based on information included in the first image, generate a second image of the external object at least based on the first image when the quality of the first image corresponds to a given condition, and perform authentication on the external object at least based on the at least one template using at least one of the first image or the second image.

In accordance with another aspect of the disclosure, an electronic device is provided. The electronic device includes a fingerprint sensor, a memory configured to store at least one template for an authenticated fingerprint, and a processor. The processor may be configured to obtain a first image of an external object using the fingerprint sensor, perform authentication on the external object based on the at least one template using the first image, and update at least some of the at least one template using the first image based on a result of the authentication.

An electronic device according to various embodiments includes a transparent member, a display positioned under a transparent member and configured to include a plurality of pixels, an image sensor positioned under at least some area of the display, a memory configured to store at least one template, and a processor. The processor may be configured to obtain light output through at least some of the plurality of pixels and reflected by an external object coming into contact with the transparent member using the image sensor, obtain a first image of the external object based on the reflected light, determine quality of the first image at least based on information included in the first image, generate a template using at least some of the first image when the quality of the first image is a first reference value or more, determine whether the quality of the first image is a second reference value or more when the quality of the first image is less than the first reference value, generate a second image of the external object at least based on the first image and generate a template using at least some of the generated second image when the quality of the first image is the second reference value or more, and store the generated template in the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
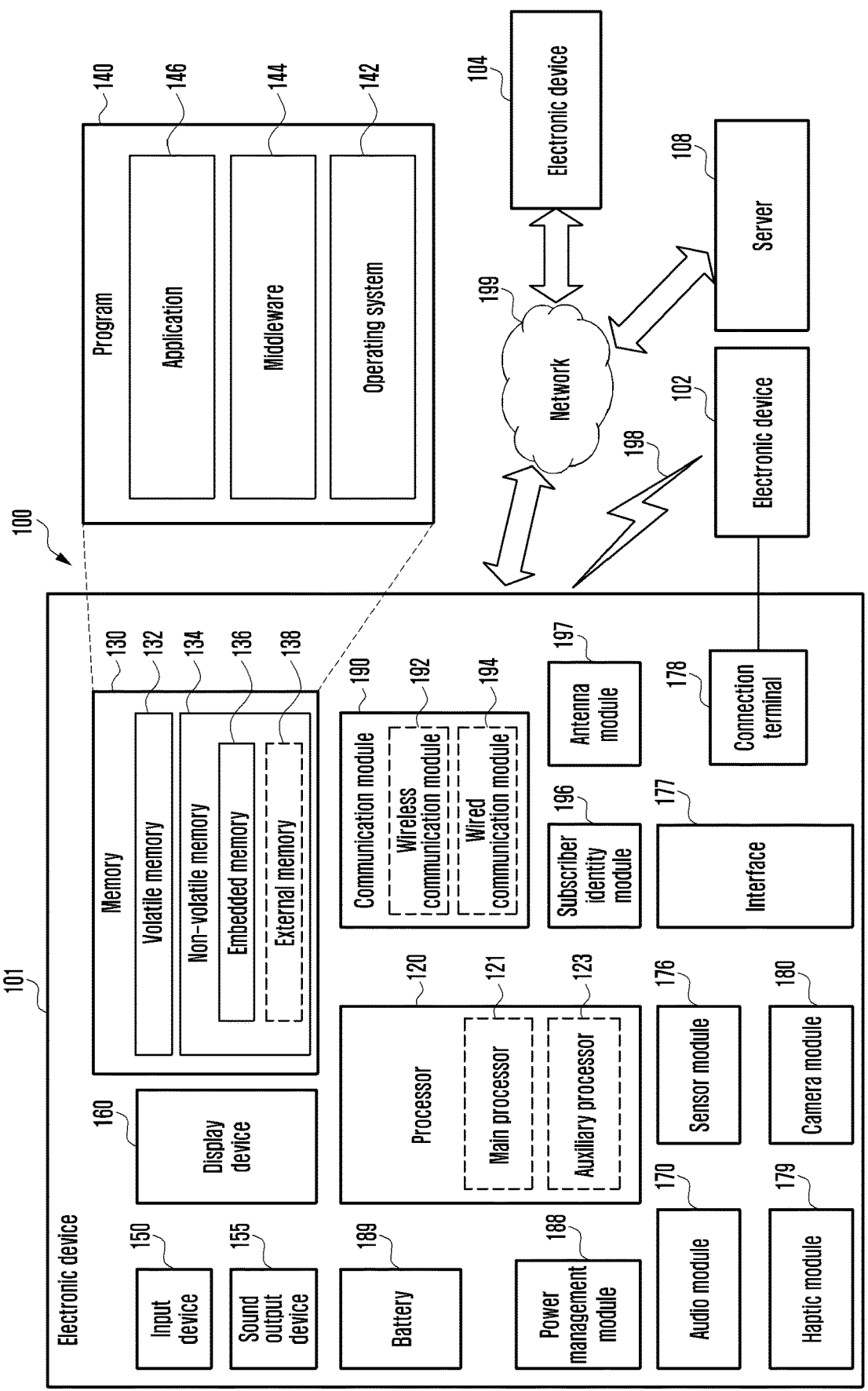
FIG. 1 is a block diagram of an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with a first external electronic device 102 via a first network 198 (e.g., a short-range wireless communication network), or a second external electronic device 104 or a server 108 via a second network 199 (e.g., a long-range wireless communication network). According to an embodiment of the disclosure, the electronic device 101 may communicate with the second external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an ISP or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the first external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the first external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the first external electronic device 102). According to an embodiment of the disclosure, the connection terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the first external electronic device 102, the second external electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the second external electronic device 104 via the server 108 coupled with the second network 199. Each of the first and second external electronic devices 102 and 104 may be a device of a same type as, or a different type, from the electronic device 101. According to an embodiment of the disclosure, all or some of operations to be executed at the electronic device 101 may be executed at one or more of the first and second external electronic devices 102 and 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
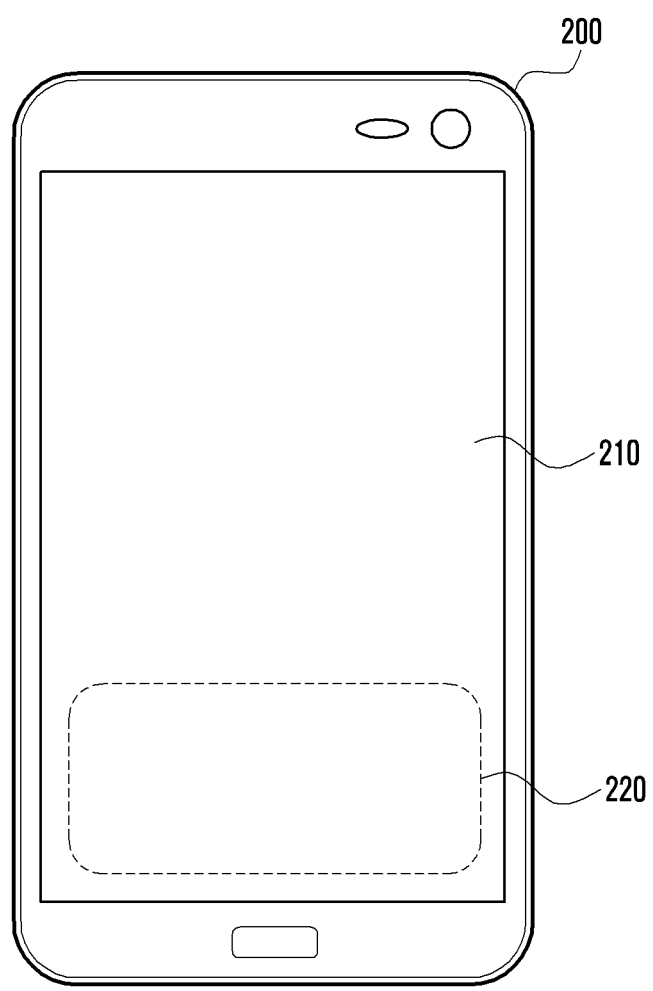
FIG. 2A illustrates a front of an electronic device according to an embodiment of the disclosure.

FIG. 2A illustrates a front of an electronic device according to an embodiment of the disclosure.

Figure 2B:
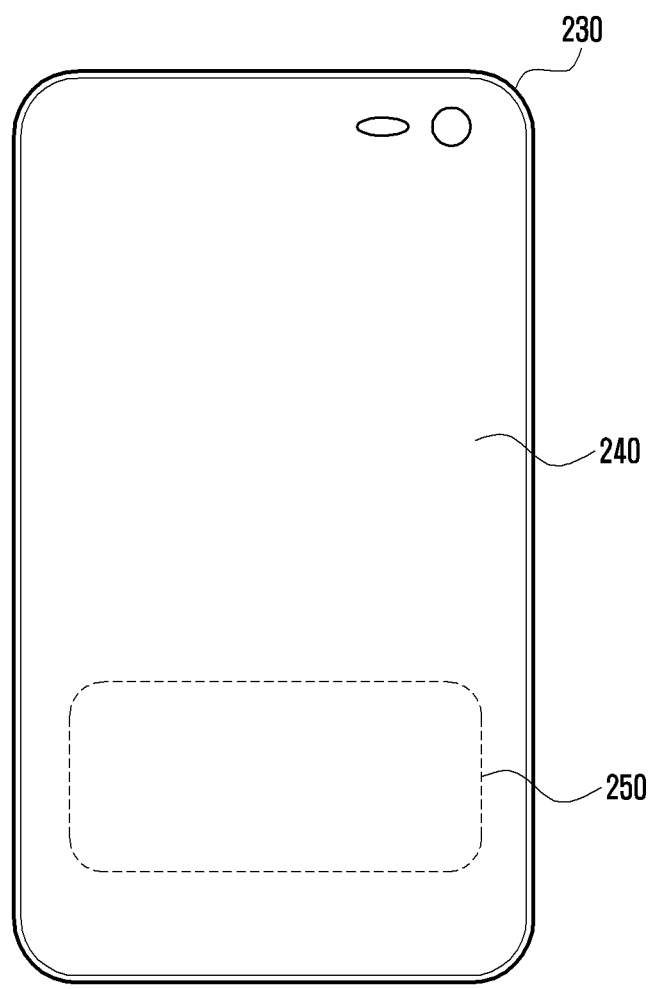
FIG. 2B illustrates a front of an electronic device according to an embodiment of the disclosure.

FIG. 2B illustrates a front of an electronic device according to an embodiment of the disclosure.

Referring to FIG. 2A, a bio sensor 220 (e.g., a fingerprint sensor) configured to recognize bio information (e.g., fingerprint information) may have been formed in at least some area of the display 210 of the electronic device 200. For example, the bio sensor 220 is formed in at least some (e.g., the active area or black matrix (BM) area of the display) of the display 210, thus being capable of obtaining bio information on a user using a user input to the display 210.

Referring to FIG. 2B, the electronic device 230 includes a bio sensor 250 in at least some of a display 240, thereby being capable of expanding the size of the display by forming an area occupied by the bio sensor as the display 240.

Figure 3:
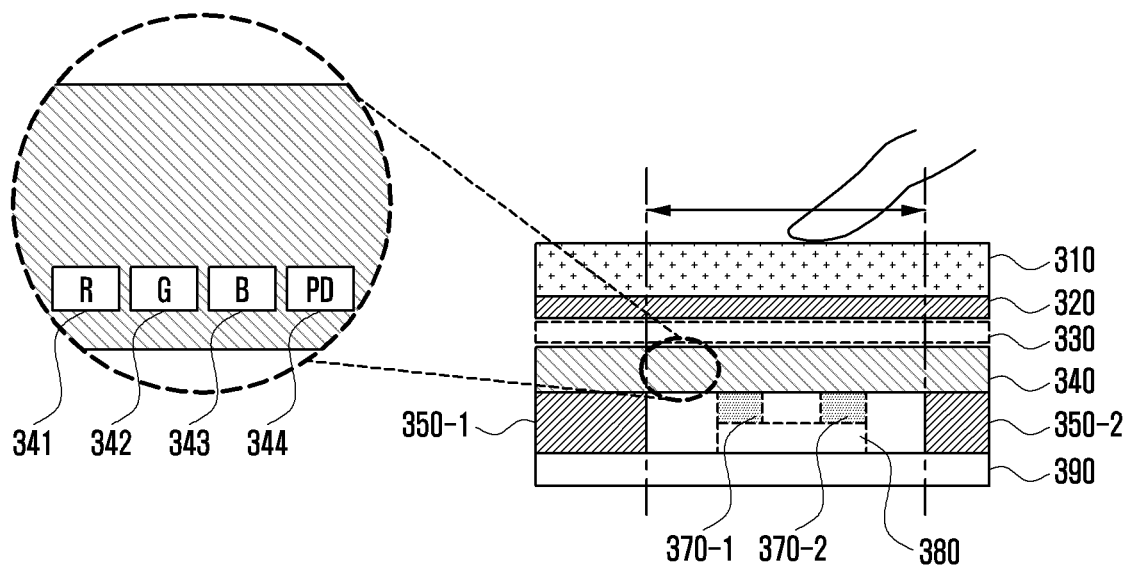
FIG. 3 illustrates a structure on which a bio sensor is mounted on an electronic device according to an embodiment of the disclosure.

FIG. 3 illustrates a structure on which a bio sensor is mounted on an electronic device according to an embodiment of the disclosure.

Referring to FIG. 3, the bio sensor (e.g., the bio sensor 220 of FIG. 2, a fingerprint sensor 330 or a fingerprint sensor 380) configured to detect bio information of a user is mounted in at least some area of the display 340 of an electronic device (e.g., the electronic device 200 or 230 of FIG. 2 or the electronic device 101 of FIG. 1) according to an embodiment of the disclosure.

In accordance with an embodiment of the disclosure, the electronic device may include a transparent member 310 (e.g., glass), the fingerprint sensor 330, the display 340, the fingerprint sensor 380 or a PCB 390. The transparent member 310 may be bonded to the fingerprint sensor 330 or the display 340 through an adhesive layer 320.

In accordance with an embodiment of the disclosure, the electronic device may further include structures 350-1 and 350-2 for securing the space on which the bio fingerprint 380 is mounted. In this case, the structures 350-1 and 350-2 may form at least some of a sealing structure for protecting the fingerprint sensor 380.

In accordance with an embodiment of the disclosure, the fingerprint sensor 330, 380 may be formed in some area (e.g., one area or a plurality of areas) of the display 340 or the entire area (e.g., the active area of the display) of the display.

In accordance with an embodiment of the disclosure, the fingerprint sensor 330, 344 capable of detecting bio information may be formed in one surface (e.g., top) of the display (e.g., a separate layer (i.e., finger print sensor 330) on one surface of the display or at least some area of a surface where the pixels (341 to 343) of the display are formed).

In accordance with an embodiment of the disclosure, the fingerprint sensor 380 may be formed in the other surface (e.g., back) of the display. The fingerprint sensor 330, 344, 380 may include an image sensor of an optical method, a transmission/reception module of an ultrasonic method or a transmission/reception electrode pattern of an electrostatic method, for example.

In accordance with various embodiments of the disclosure, the fingerprint sensor 330 may be formed between the adhesive layer 320 and the display 340 or between the transparent member 310 (e.g., window glass) and the adhesive layer 320. In accordance with an embodiment of the disclosure, the fingerprint sensor 330 may be formed in the form of a transmission/reception electrode pattern of an electrostatic method, and may be formed as a transparent electrode in order to increase transmittance of light output by the display 340. In accordance with an embodiment of the disclosure, the fingerprint sensor 330 may also include a transmission/reception module of an ultrasonic method.

In accordance with various embodiments of the disclosure, the fingerprint sensor 380 may be formed in the other surface of the display of the electronic device. Elastic bodies 370-1 and 370-2 (e.g., sponge or rubber) configured to reduce an impact between the fingerprint sensor 380 and the display 340 or to prevent the inflow of an alien substance may be formed between the fingerprint sensor 380 and the display 340. In accordance with an embodiment of the disclosure, the fingerprint sensor 380 may include an image sensor. For example, the image sensor may output light (e.g., a visible ray or IR rays), emitted from a light source (e.g., the display 340 or an IR LED), to a user's fingerprint and may detect light reflected by the user's fingerprint.

Figure 4:
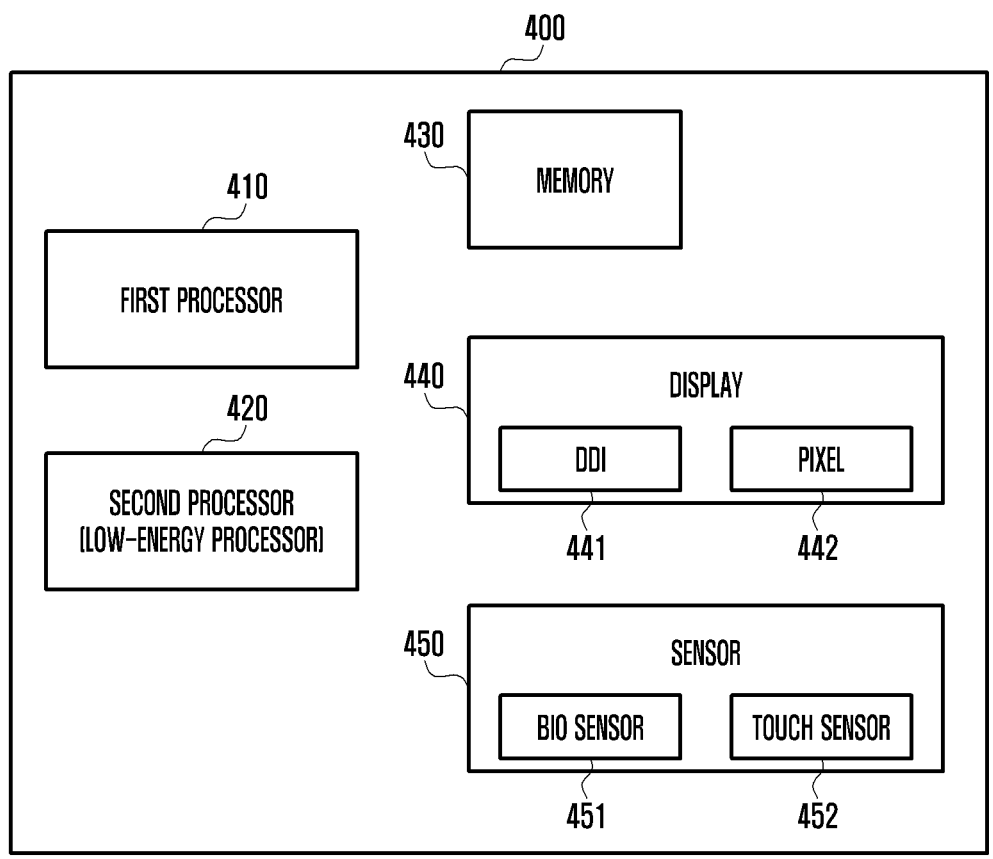
FIG. 4 is a block diagram of an electronic device according to an embodiment of the disclosure.

FIG. 4 is a block diagram of an electronic device according to an embodiment of the disclosure.

Referring to FIG. 4, in accordance with an embodiment of the disclosure, an electronic device 400 may include at least one processor (e.g., a first processor 410 or a second processor 420), a memory 430, a display 440 or at least one sensor 450.

In accordance with an embodiment of the disclosure, the first processor 410 may control overall driving of the electronic device 400. The second processor 420 (e.g., a low-energy processor or a sensor HUB) does not wake up the first processor 410, but may process sensor information obtained through the at least one sensor 450 or input obtained from a user when the electronic device 400 is a sleep state.

In accordance with an embodiment of the disclosure, the second processor 420 may control a bio sensor 451, a touch sensor 452 or the display 440 independently of the first processor 410.

The electronic device 400 according to an embodiment may include the memory 430.

For example, the memory 430 may include a common area in which a user application is stored or a security area in which information sensitive to security, such as information for fingerprint sensing, is stored.

For example, the memory 430 may store at least one template used for fingerprint authentication. For example, at least one template stored in the memory 430 may be classified as a different category and stored based on an image used to generate a template.

In accordance with an embodiment of the disclosure, the display 440 may include a display panel 442 including a plurality of pixels and a display driving module (e.g., display driver integrated circuit (IC) (DDI) 441) configured to provide display information by controlling at least some of the plurality of pixels included in the display panel 442.

In accordance with an embodiment of the disclosure, the sensor 450 may include the bio sensor 451 (e.g., fingerprint sensor) configured to detect a user's fingerprint for the display 440 or the touch sensor 452 configured to detect a user's touch on the display 440. In accordance with an embodiment of the disclosure, the bio sensor 451 may include an optical fingerprint sensor (e.g., image sensor) using light output by the display as a light source.

In accordance with various embodiments of the disclosure, the at least one sensor 450 may drive the plurality of pixels, included in the display panel 442, through the display driving module 441 in response to a user input.

In accordance with an embodiment of the disclosure, the at least one sensor 450 may control the display panel 442, if necessary. For example, the bio sensor 451 may use light emitted from the display by controlling the display panel 442 in order to obtain a user's bio information.

Figure 5:
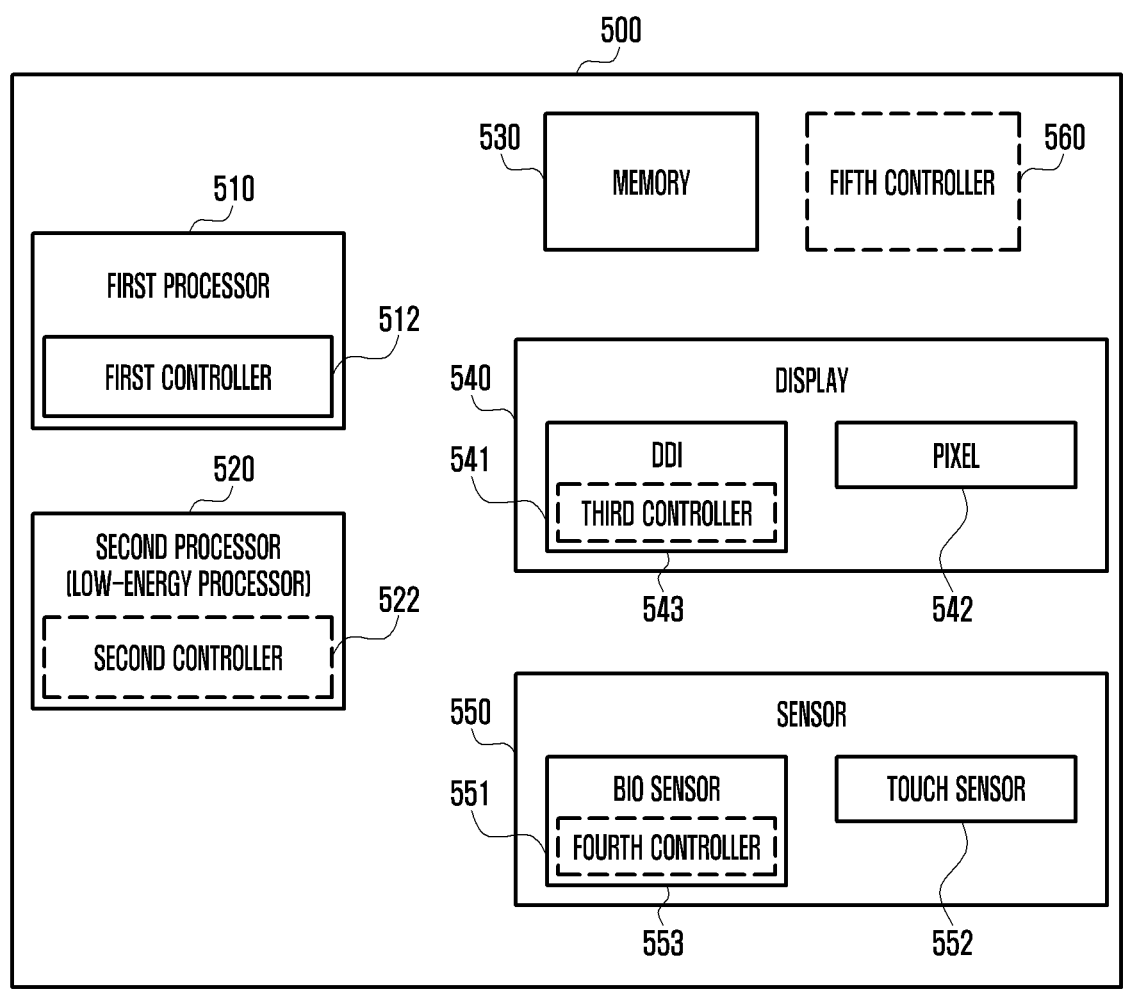
FIG. 5 is a block diagram of an electronic device according to an embodiment of the disclosure.

FIG. 5 is a block diagram of an electronic device according to an embodiment of the disclosure.

Referring to FIG. 5, in accordance with an embodiment of the disclosure, an electronic device 500 may include a plurality of controllers (e.g., a first controller 512, a second controller 522, a third controller 543, a fourth controller 553 or a fifth controller 560). Each controller may be included in each module (e.g., a first processor 510, a second processor 520, a DDI 541, a pixel, 542, a touch sensor 552, or a bio sensor 551) included in the electronic device 500.

For example, the electronic device 500 may control the first processor 510 using the first controller 512 and control the second processor 520 using the second controller 522. Furthermore, the electronic device 500 may control the module included in the third controller 543, the fourth controller 553 using the third controller 543, the fourth controller 553.

In accordance with an embodiment of the disclosure, the modules of the electronic device 500 may be controlled using a single controller.

For example, the electronic device 500 may control the plurality of controllers (e.g., the first controller 512, the second controller 522, the third controller 543 or the fourth controller 553) using a main controller (e.g., a fifth controller 560). The electronic device 500 may designate a main controller and control other controllers using the designated main controller. For example, the electronic device 500 may change/designate a main controller from the fifth controller 560 to the first controller 512, and may control other controllers using the designated main controller.

In accordance with an embodiment of the disclosure, the electronic device 500 may directly control the modules of the electronic device 500 using a single controller. For example, the electronic device 500 may control the second processor 520, a memory 530, the display 540 and/or at least one sensor 550 using the first controller 512 included in the first processor 510.

In accordance with an embodiment of the disclosure, the display 540 and the at least one sensor 550 may be controlled through a single controller. For example, in the case of an optical fingerprint sensor using a display 540 as a light source, the display 540 and the sensor 550 may be controlled using a single controller, and a user's bio information can be easily obtained.

Figure 6:
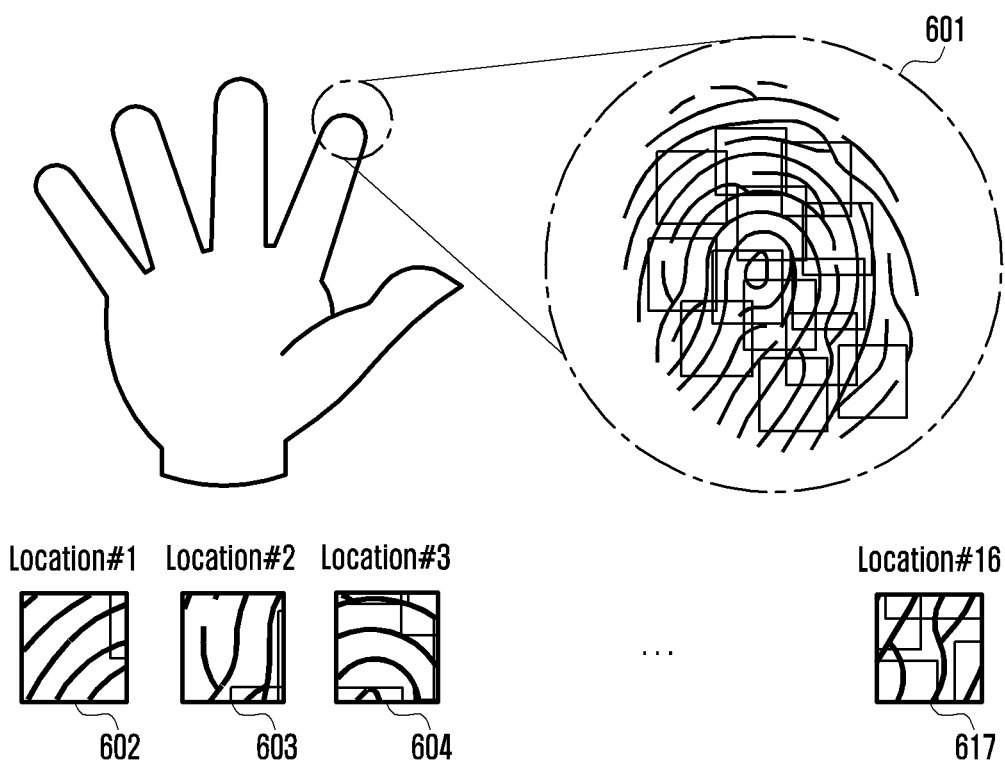
FIG. 6 is a diagram illustrating a template used for authentication in an electronic device according to an embodiment of the disclosure.

FIG. 6 is a diagram illustrating a template used for authentication in an electronic device according to an embodiment of the disclosure.

In accordance with various embodiments of the disclosure, an electronic device may obtain a user's fingerprint information using a bio sensor (e.g., fingerprint sensor). For example, the bio sensor may include an image sensor positioned under at least some area of the display of an electronic device.

For example, the display may include a plurality of pixels. At least some of the plurality of pixels may output light, used to obtain fingerprint information, to the outside. For example, when a user brings an external object (e.g., a finger) into contact with a transparent member on the display, light output by the plurality of pixels may be reflected by the external object and input to the image sensor. For example, the image sensor may obtain an image, corresponding to the external object (e.g., a finger fingerprint), based on the reflected light. The image may include fingerprint information, for example.

Referring to FIG. 6, in accordance with various embodiments of the disclosure, the electronic device may generate a template using fingerprint information included in an obtained image 601.

For example, the template may include a plurality of (e.g., 16) sub-images 602, 603, 604, . . . , 617 from the one image 601 corresponding to one finger. For example, as shown in FIG. 6, the template may include the sub-images 602, 603, 604, . . . , 617 which may be obtained by classifying the image 601 included in the fingerprint information by a given number depending on the location of the finger. For example, at least some area of the sub-images 602, 603, 604, . . . , 617 may overlap.

For another example, the template may have a form of a single image obtained by stitching the plurality of sub-images 602, 603, 604, . . . , 617 corresponding to the respective areas of the fingerprint.

In accordance with an embodiment of the disclosure, one template may be generated from a single image and may be configured as a combination of sub-images generated from a plurality of different images.

Figure 7:
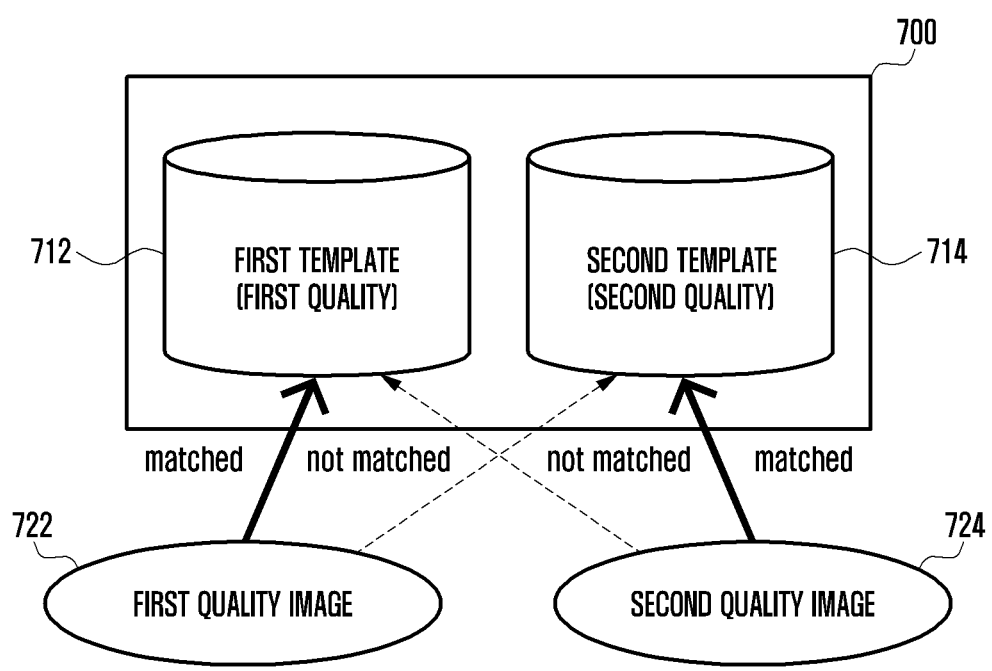
FIG. 7 is a diagram illustrating a fingerprint authentication process in an electronic device according to an embodiment of the disclosure.

FIG. 7 is a diagram illustrating a fingerprint authentication process in an electronic device according to an embodiment of the disclosure.

In accordance with various embodiments of the disclosure, a memory 700 of an electronic device may store at least one template.

For example, an electronic device may obtain fingerprint information from a user in order to generate and store a template which may be used for fingerprint authentication. For example, the electronic device may output light from at least some of a plurality of pixels of a display, and may obtain an image including fingerprint information based on the degree that the output light is reflected by an external object (e.g., a user's finger) touching a transparent member (e.g., glass) on an image sensor.

The electronic device may generate a template at least based on the image, and may store the generated template in the memory 700. For example, the electronic device may extract minutia from the obtained image and generate the template at least based on the obtained minutia.

In accordance with various embodiments of the disclosure, an image including fingerprint information may have different quality depending on the dry degree (or a degree of contained oil or a temperature state) of a finger of a user when the image was obtained. For example, quality of an image used to generate a template when a fingerprint is registered and quality of an image newly obtained when the fingerprint is authenticated may be different depending on the dry degree of a corresponding finger of a user, that is, a fingerprint state, although the image is obtained based on the fingerprint of the same user.

For example, in a fingerprint registration operation, if an image has been obtained from a user's finger and a template has been generated using the image, fingerprint authentication may succeed or fail depending on the finger state of the user although the fingerprint authentication is performed using the finger of the same user in a fingerprint recognition operation.

For example, if a template has been generated using a finger of a moist state in a fingerprint registration operation, in a fingerprint authentication-operation, authentication succeeds when the finger of a user is a moist state, but may fail when the finger of the user is a low moisture state.

For another example, if a template has been generated using a finger of a low moisture state in a fingerprint registration operation, although authentication is performed using the finger of the same user in a fingerprint authentication operation, the authentication fails when the finger of the user is a moist state, but may be successful when the finger of the user is a low moisture state.

In accordance with various embodiments of the disclosure, an electronic device may determine quality of each image based on information included in the image obtained from an image sensor. In this case, the quality may mean the dry degree of a fingerprint corresponding to the obtained image. For example, in an image obtained based on a dry finger fingerprint, a curve of the fingerprint may not be relatively clearly indicated compared to an image obtained based on a finger fingerprint of a moist state.

An electronic device according to various embodiments may determine quality of an image, that is, the dry degree of a finger fingerprint used to obtain an image, using at least one method of Local clarity score, Orientation certainty level, Fuzziness or Standard deviation, for example. For example, the quality of the image may be different depending on an external environment although the image has been obtained by the same user.

Referring to FIG. 7, the electronic device according to various embodiments may generate a first template 712 using a first image corresponding to first quality and store the generated first template 712 in the memory 700 in a fingerprint registration operation.

For example, when fingerprint authentication is performed by the same user as a user who has registered a fingerprint in a fingerprint authentication operation, if the fingerprint authentication is performed based on the first template 712 using an image having quality identical with or similar to quality (e.g., first quality) of the first image, the electronic device may determine the fingerprint authentication to be successful. If fingerprint authentication based on the first template 712 is performed using an image having quality (e.g., second quality) quite different from quality (e.g., first quality) of the first image, however, the electronic device may determine the fingerprint authentication to fail because it considers the fingerprint of a user registered in a fingerprint registration operation to be different from the fingerprint of a user on which authentication has been performed in a fingerprint authentication operation.

An electronic device according to various embodiments of the disclosure may generate the first template 712 using the first image corresponding to the first quality when it obtains the first image from an image sensor in a fingerprint registration operation. Furthermore, the electronic device may obtain a second image corresponding to the second quality from the image sensor or generate the second image corresponding to the second quality at least based on the first image, and may generate a second template 714 using the second image.

For example, when the same user as a user in a registration operation performs authentication using an image having quality identical with or similar to the first quality in a fingerprint authentication operation, the electronic device may determine the authentication of the first image 722, corresponding to the first quality, to be successful with respect to fingerprint authentication based on the first template 712.

For example, when the user performs authentication using an image having quality identical with or similar to the second quality, the electronic device may determine the authentication of the second image 724, corresponding to the second quality, to be successful with respect to fingerprint authentication based on the second template 714.

Figure 8A:
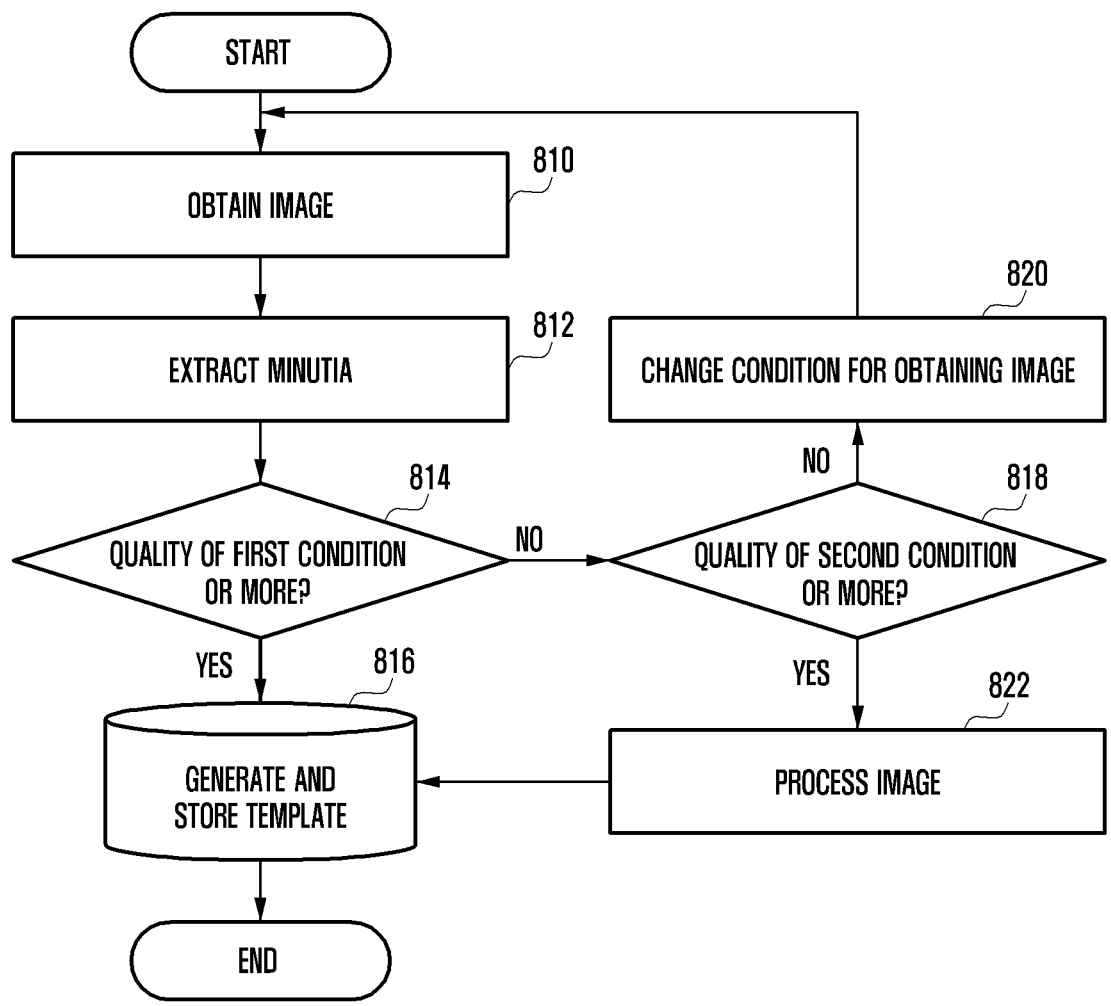
FIG. 8A is a flowchart regarding a fingerprint registration method in an electronic device according to an embodiment of the disclosure.

FIG. 8A is a flowchart regarding a fingerprint registration method in an electronic device according to an embodiment of the disclosure.

In accordance with various embodiments of the disclosure, in a fingerprint registration operation, an electronic device may generate a template using an image including fingerprint information, and may store the generated template in the memory.

Referring to FIG. 8A, the electronic device (e.g., the first processor 510 of FIG. 5) according to various embodiments may obtain an image regarding fingerprint information of a user at operation 810. For example, the electronic device may obtain an image including fingerprint information using a bio sensor.

The electronic device (e.g., the first processor 510 of FIG. 5) according to various embodiments may extract a given minutia from the obtained image at operation 812. For example, the minutia may include unique feature information of a fingerprint which may be obtained from the image. For example, the fingerprint may include a ridge area and a valley area. The minutia may be extracted based on the intersection of the ridge area of a fingerprint or the end point of a ridge area.

In accordance with an embodiment of the disclosure, unlike in FIG. 8A, the electronic device may substitute operation 812 with a different operation or may omit operation 812.

For example, the electronic device may extract a minutia from the obtained image or extract the pattern of the obtained image. Alternatively, the electronic device may extract both the minutia and the image pattern.

In accordance with various embodiments of the disclosure, the electronic device may determine quality of the image at least based on the obtained image or the minutia extracted from the image. For example, the quality of the image may be determined based on the dry degree of the fingerprint corresponding to the image. For example, if a user's environment is a dry environment, the moisture of a fingerprint of the user becomes a dry state, so an accurate fingerprint image may not be obtained through the fingerprint recognition area of the electronic device. For example, quality of an image obtained through a fingerprint in the dry state may be lower than quality of an image obtained through the fingerprint in the humid state.

For example, the operation of determining the quality of the image may be performed using at least one method of Local clarity score, Orientation certainty level, Fuzziness or Standard deviation. Furthermore, another method other than the local clarity score, orientation certainty level, Fuzziness or standard deviation may be used.

For example, the electronic device may determine quality of an image and quantify a quality index regarding the quality.

For example, the electronic device (e.g., the first processor 510 of FIG. 5) may determine whether the determined quality of the image corresponds to a preset condition (e.g., a first condition) at operation 814.

For example, the electronic device may determine whether the quality of the image corresponds to the first condition (e.g., a first reference value or more).

For example, if it is determined that the quality of the image corresponds to the first condition (e.g., the first reference value or more), the electronic device may generate a template based on the image and store the generated template in memory at operation 816.

At operation 818, if it is determined that the quality of the image does not correspond to the preset first condition (e.g., the first reference value or more), the electronic device may determine whether the quality of the image corresponds to a second condition (e.g., a second reference value or more). For example, the electronic device may perform a different operation depending on whether the quality of the image is the second reference value or more.

For example, if it is determined that the quality of the image corresponds to the second condition (e.g., the second reference value or more), the electronic device may perform given processing on the image at operation 822. For example, the electronic device may generate a second image corresponding to second quality using the first image corresponding to the first quality through the processing. The processing may be performed using at least one method of normalize, contrast enhancement, a bandpass filter or a Garbor filter. Furthermore, the processing may be performed a different known method in addition to the method of normalize, contrast enhancement, bandpass filter or Garbor filter.

In accordance with various embodiments of the disclosure, the electronic device may generate a template based on the processed image (e.g., the second image corresponding to the second quality), and may store the generated template in the memory.

For example, when the obtained image corresponds to quality of the first reference value or more, the electronic device may generate a template using the image without separate image processing, and may store the generated template. In accordance with an embodiment of the disclosure, if the template is generated through an image directly obtained from an image sensor without the image processing process, the electronic device may store the template in the memory as a reference template. In accordance with an embodiment of the disclosure, if the template is generated through an image (e.g., an image corresponding to the second quality) generated by an image processing process, the electronic device may store the template in the memory as a sub-template.

In accordance with an embodiment of the disclosure, the reference template may mean a template, that is, a target on which authentication is first performed along with an image in a fingerprint authentication operation. Furthermore, the sub-template may mean a template used for next authentication when authentication fails after the authentication is performed based on a reference template.

In accordance with an embodiment of the disclosure, the reference template may mean a template generated through an image directly obtained from a user other than a template generated through an image processed by an electronic device.

For example, when authentication executed in a fingerprint authentication operation is successful based on the reference template, the electronic device may permit all types of access to a preset function corresponding to the authentication success. For another example, when authentication executed in a fingerprint authentication operation is successful based on another sub-template other than the reference template, the electronic device may permit only access to at least some of preset functions corresponding to the authentication success.

In accordance with various embodiments of the disclosure, if it is determined that the quality of the image does not correspond to both the first condition and the second condition, for example, when the quality of the image is less than the first reference value and less than the second reference value, the electronic device may change a condition for obtaining an image at operation 820.

For example, in order to change the condition for obtaining an image, the electronic device may change at least one setting of the plurality of pixels of a display or an image sensor. For example, the electronic device may increase intensity of light output by a plurality of pixels or may increase the sensitivity of an image sensor.

In accordance with an embodiment of the disclosure, operation 814 of determining quality of the first condition or more and operation 818 of determining quality of the second condition or more may be performed by a single operation of determining quality. For example, the electronic device may determine quality of an image, may determine whether the determined quality value corresponds to a given reference (e.g., a first reference or a second reference) based on a preset reference value (e.g., a first reference value or a second reference value), and may perform operation 816 of generating the template, operation 822 of performing the image processing or operation 820 of changing the condition for obtaining an image.

Figure 8B:
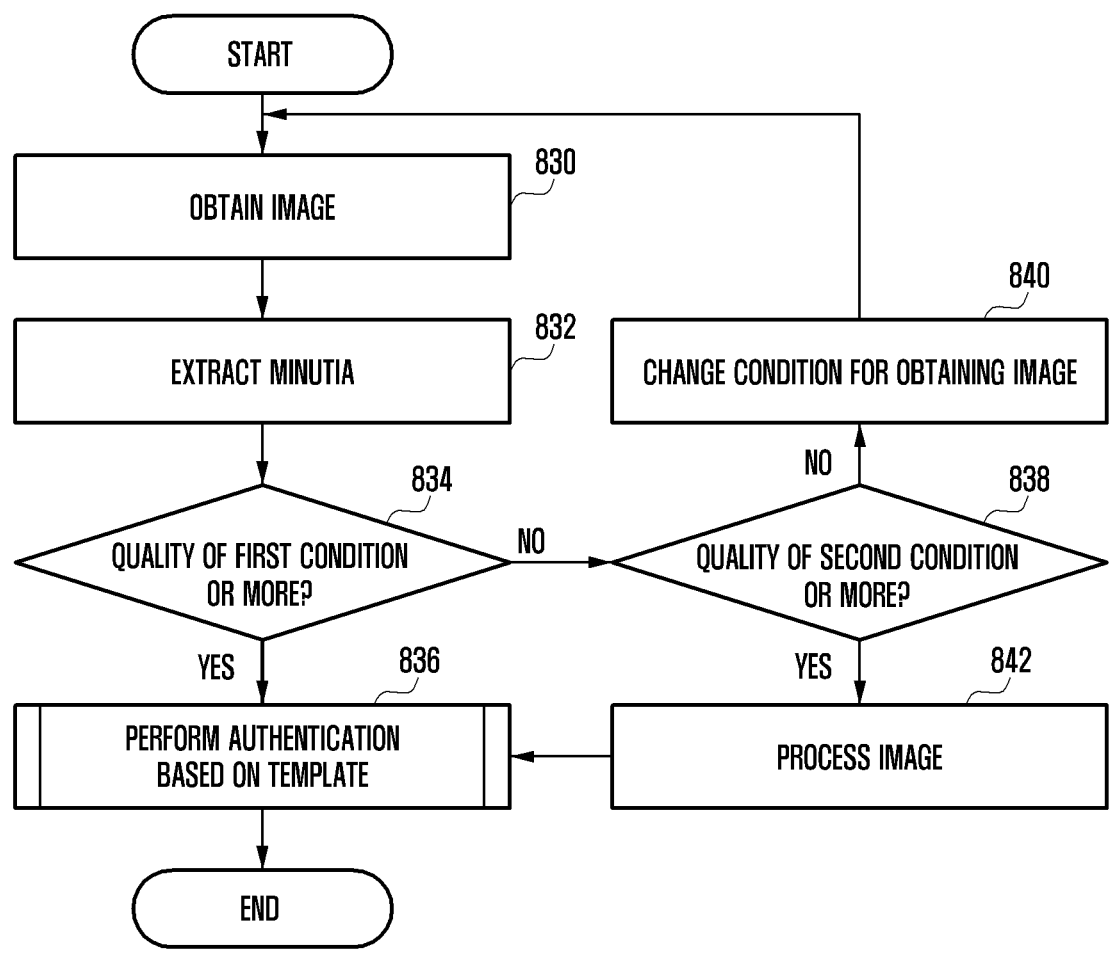
FIG. 8B is a flowchart regarding a fingerprint authentication method according to an embodiment of the disclosure.

FIG. 8B is a flowchart regarding a fingerprint authentication method according to an embodiment of the disclosure.

Referring to FIG. 8B, an electronic device according to various embodiments may obtain an image using an image sensor for the purpose of fingerprint authentication at operation 830.

In accordance with various embodiments of the disclosure, the electronic device may obtain a minutia from the obtained image at operation 832. In accordance with an embodiment of the disclosure, the electronic device may perform a next operation using the obtained image itself without the intervention of operation 832.

At operation 834, the electronic device may determine quality of the image using at least one of the obtained image or the obtained minutia, and may determine whether the quality of the image corresponds to a preset reference.

For example, the operation of determining the quality of the image may be performed using at least one method of Local clarity score, that is, a criterion regarding whether a ridge area and a valley area in an image are clearly distinguished, Orientation certainty level, that is, a criterion based on directivity information of the ridge area and valley area, Fuzziness indicative of the degree of fuzziness of the image or a Standard deviation based on a light and shade deviation between the ridge area and the valley area. For example, the electronic device may quantify the quality of the image as a quality index.

The electronic device may determine whether the quality of the image corresponds to a preset condition (e.g., a first condition). For example, the electronic device may determine whether the quality of the image is a first reference value or more.

For example, if it is determined that the quality of the image corresponds to the first reference value or more, the electronic device may perform fingerprint authentication at least based on the image and a template, previously stored through a fingerprint registration operation, at operation 836.

For example, when the quality of the image does not correspond to the first condition (e.g., when the quality of the image is less than the first reference value), the electronic device may determine whether the quality of the image corresponds to a preset second condition at operation 838.

For example, the second condition may mean whether the quality of the image is a second reference value or more.

For example, when the quality of the image does not correspond to the first condition, but corresponds to the second condition, the electronic device may perform processing on the image at operation 842. For example, the processing may be performed using at least one method of normalize, contrast enhancement, a bandpass filter or a Garbor filter.

In accordance with various embodiments of the disclosure, the electronic device may perform the fingerprint authentication based on a processed image and a previously stored template at operation 836.

For example, when the quality of the image does not correspond to both the first condition and the second condition (e.g., the quality of the image is less than the first reference value and less than the second reference value), at operation 840, the electronic device may change a condition for obtaining an image.

For example, the electronic device may change at least one setting of the plurality of pixels of a display or an image sensor in order to change the condition for obtaining an image. For example, the electronic device may increase intensity of light output by the plurality of pixels or increase the sensitivity of an image sensor.

Unlike in FIG. 8B, an electronic device according to various embodiments may perform fingerprint authentication at least based on a previously stored at least one template using an obtained image (or a minutia obtained from the image). For example, when the authentication is successful based on the results of the authentication, the electronic device may provide a function corresponding to the authentication success. When the authentication fails, the electronic device may determine quality of the image and whether the quality of the image corresponds to a preset reference like operation 834 of FIG. 8B.

For example, an electronic device may obtain an image and first determine an authentication success. The electronic device may perform an operation of processing the image or changing a condition for obtaining an image depending on whether quality of the image corresponds to a preset reference only when the authentication fails.

For another example, when an electronic device obtains an image, it may first determine quality of the image before it determines authentication. When the quality of the image corresponds to a preset condition (e.g., a first condition and/or a second condition), the electronic device may perform authentication, may process the image or may change a condition for obtaining an image based on an operation corresponding to each condition.

Figure 8C:
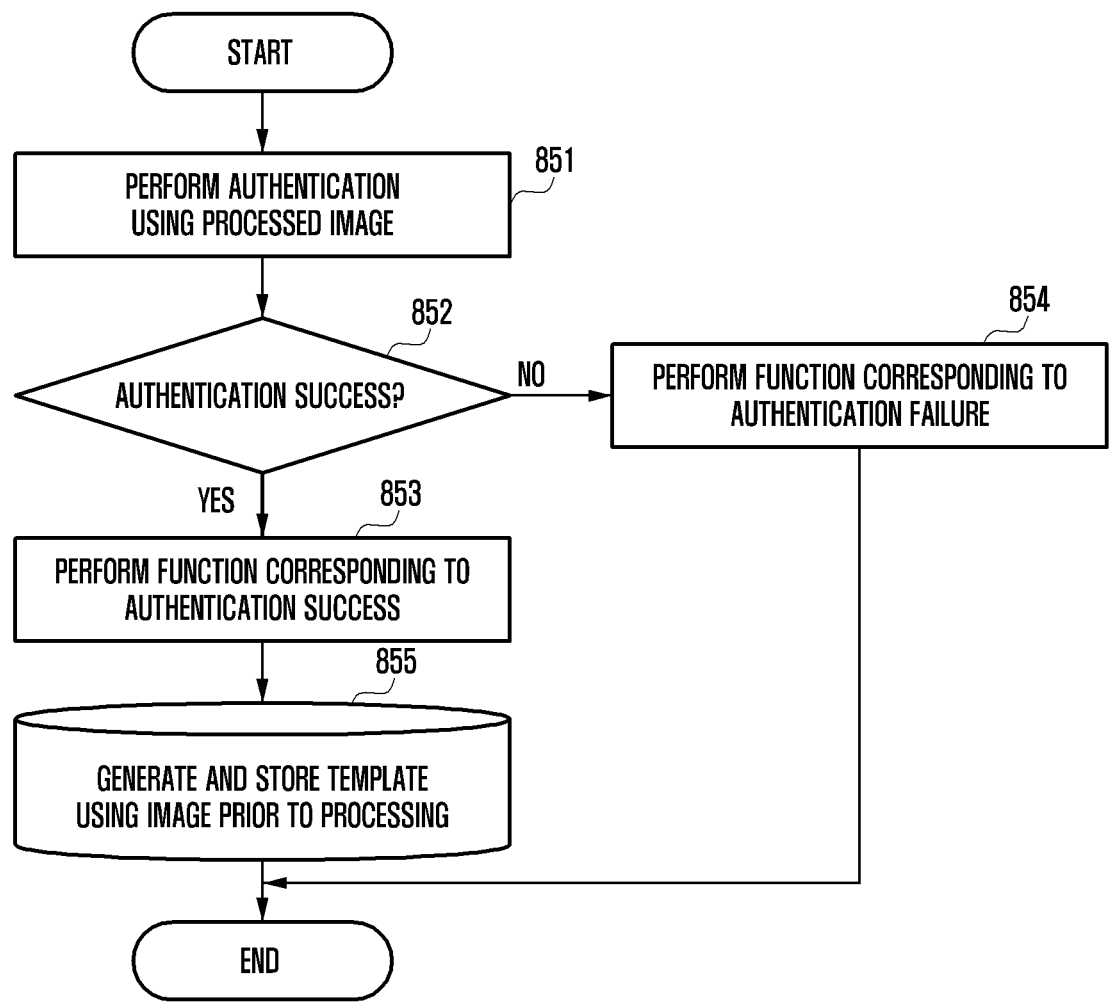
FIG. 8C is a flowchart regarding a method of performing authentication using an image processed in a fingerprint authentication-operation according to an embodiment of the disclosure.

FIG. 8C is a flowchart regarding a method of performing authentication using an image processed in a fingerprint authentication operation according to an embodiment of the disclosure.

Referring to FIG. 8C, when quality of an image obtained by an image sensor corresponds to a preset reference, an electronic device according to various embodiments may perform image processing using the obtained image, and may determine authentication using the processed image at operation 851. For example, a determination of whether the quality of the image corresponds to the preset reference may be made by operation 834 and operation 838 of FIG. 8B. Furthermore, the image processing operation may be performed by operation 842 of FIG. 8B or operation 822 of FIG. 8A.

For example, the processed image may have quality (e.g., second quality) different from quality (e.g., first quality) of the image obtained by the image sensor. For example, an image prior to the processing may have a fingerprint that is relatively drier than the processed image. For example, in an image obtained based on a fingerprint of a relatively dry state, a distinction between the ridge area and valley area of the fingerprint may not be clear.

In accordance with various embodiments of the disclosure, the electronic device may determine whether the fingerprint authentication performed using the processed image at operation 852 is successful. For example, the authentication may be performed based on at least some of a template previously stored in memory.

For example, if it is determined that the fingerprint authentication is successful, the electronic device may execute a previously stored function corresponding to the authentication success at operation 853. For example, if it is determined that the fingerprint authentication performed using the processed image is successful, the electronic device may permit access to a given function. In this case, the given function may correspond to at least some of functions to which access is permitted when fingerprint authentication performed using a not-processed original image is successful.

Furthermore, if it is determined that the fingerprint authentication fails, the electronic device may execute a previously stored function corresponding to the authentication failure at operation 854. For example, the function corresponding to the authentication failure may include a function of indicating notification regarding the fingerprint authentication failure.

In accordance with various embodiments of the disclosure, if it is determined that the fingerprint authentication performed using the processed image is successful, the electronic device may generate a template based on the original image used for image processing and store the generated template in memory at operation 855.

Figure 8D:
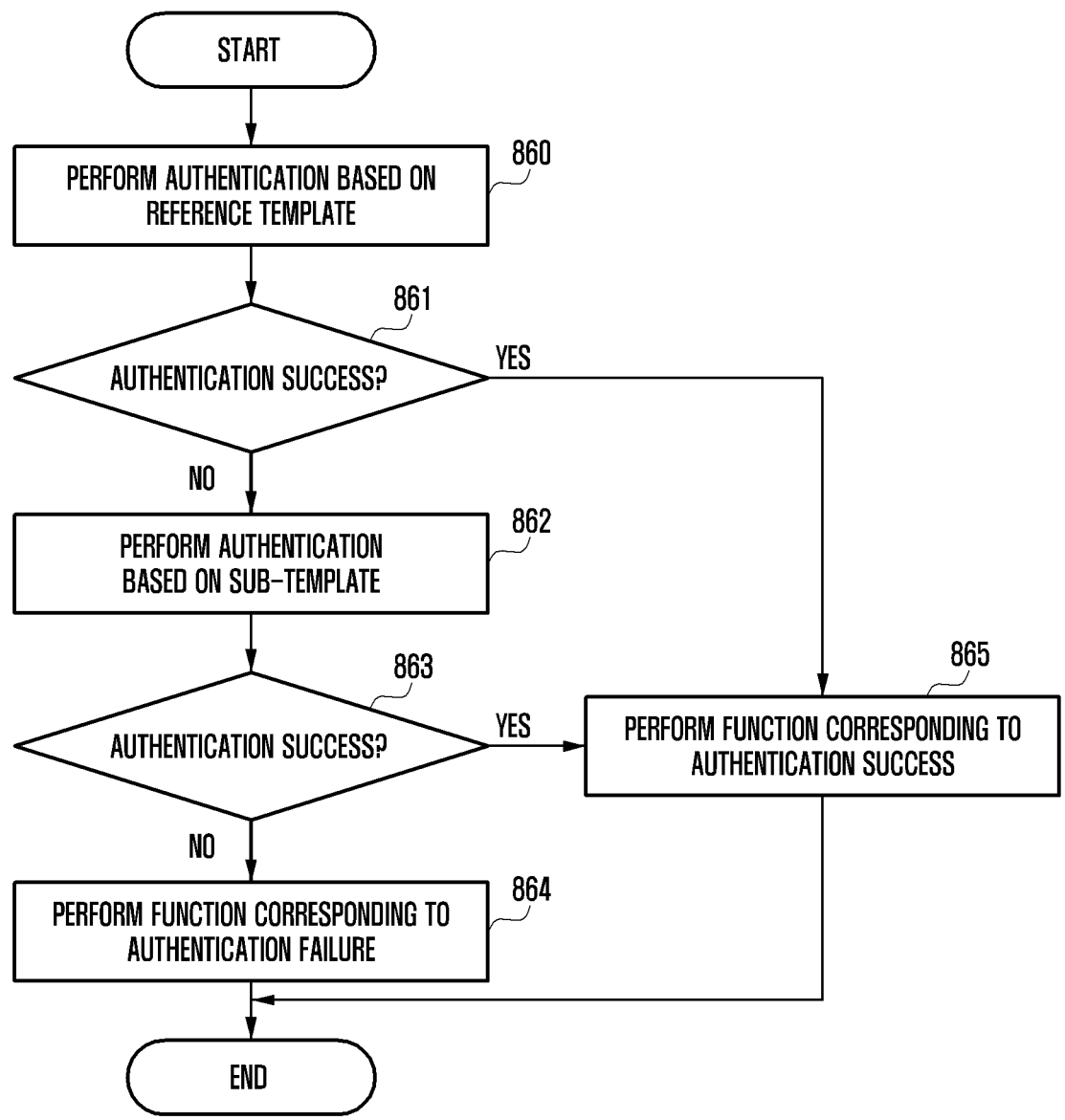
FIG. 8D is a flowchart regarding a fingerprint authentication method according to an embodiment of the disclosure.

FIG. 8D is a flowchart regarding a fingerprint authentication method according to an embodiment of the disclosure.

In accordance with various embodiments of the disclosure, an electronic device may obtain an image corresponding to an external object through an image sensor and perform fingerprint authentication using the obtained image.

In accordance with various embodiments of the disclosure, an electronic device may store a reference template and at least one sub-template in memory.

In accordance with an embodiment of the disclosure, the reference template may mean a template generated based on an image having quality of the state in which a fingerprint corresponding to the image is not dry in order to lower a missrecognition rate for fingerprint authentication.

In accordance with an embodiment of the disclosure, the reference template may mean a template generated based on the original image obtained through an image sensor other than a template generated based on a processed image.

Referring to FIG. 8D, an electronic device according to various embodiments may perform fingerprint authentication on an image, including fingerprint information to be authenticated, based on a reference template at operation 860.

The electronic device may determine whether the executed fingerprint authentication is successful at operation 861.

For example, if it is determined that the fingerprint authentication is successful, the electronic device may execute a function corresponding to the authentication success at operation 865.

In accordance with various embodiments of the disclosure, if it is determined that the fingerprint authentication fails, the electronic device may perform fingerprint authentication based on at least one of sub-templates at operation 862.

In accordance with an embodiment of the disclosure, an electronic device may preferentially perform authentication based on a given sub-template belonging to the at least one sub-template and corresponding to quality of an image to be authenticated.

For example, if it is determined that quality of an image to be authenticated corresponds to #3, an electronic device may use a template, corresponding to the #3, for authentication over the other templates. For example, when authentication based on the template corresponding to the #3 fails, the electronic device may sequentially perform authentication based on the remaining sub-templates.

For example, if it is determined that the fingerprint authentication based on at least one of the sub-templates fails, the electronic device may execute a function corresponding to the authentication failure at operation 864.

For example, if it is determined that the fingerprint authentication based on at least one of the sub-templates is successful at operation 863, the electronic device may execute a function corresponding to the authentication success at operation 865.

As described above, fingerprint authentication is performed based on a sub-template only when fingerprint authentication based on a reference template fails after the fingerprint authentication is preferentially performed based on the reference template. Accordingly, an electronic device can perform fingerprint authentication efficiently in terms of computational speed through a reference template having a relatively low missrecognition rate.

Figure 8E:
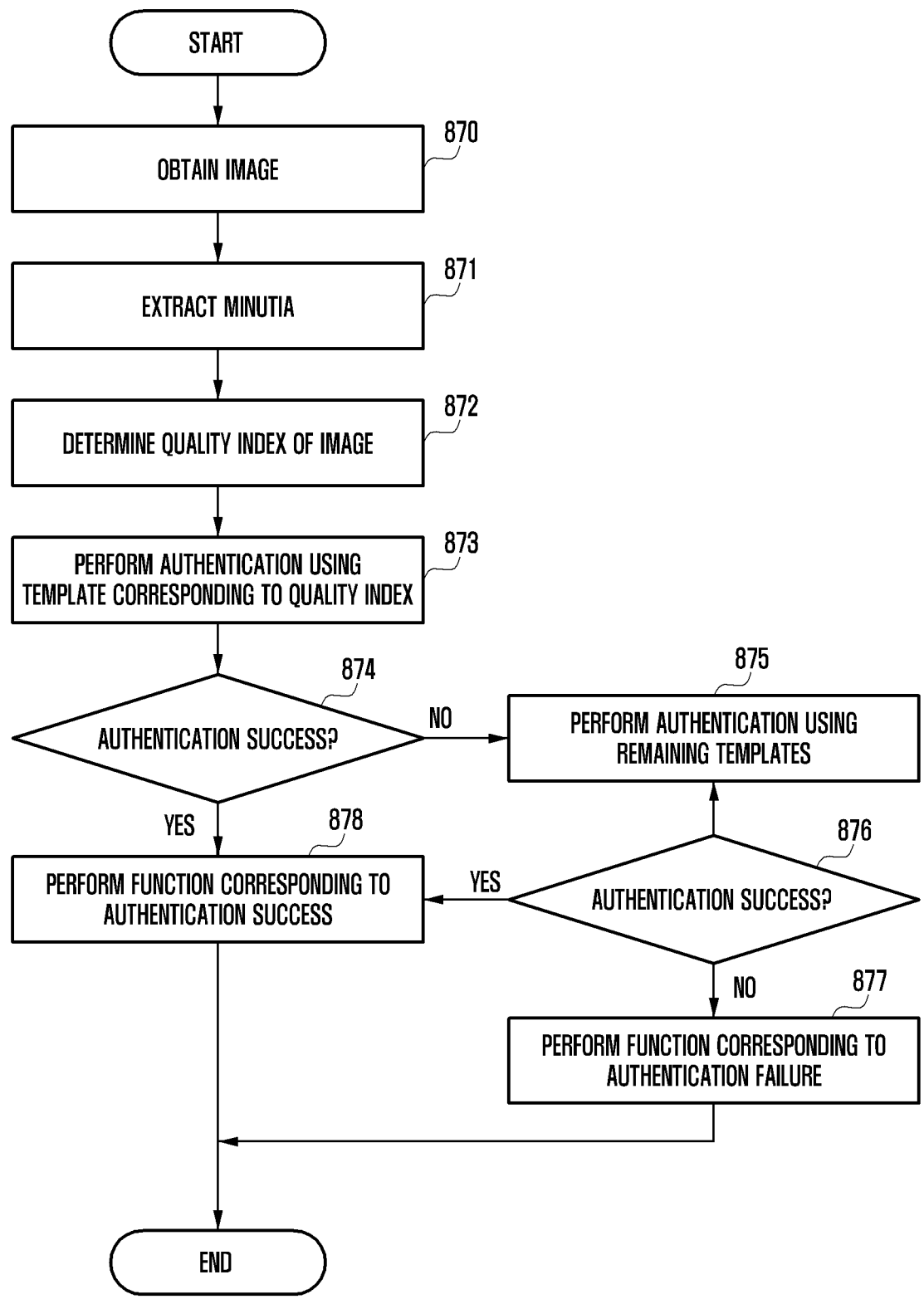
FIG. 8E is a flowchart regarding a fingerprint authentication method according to an embodiment of the disclosure.

FIG. 8E is a flowchart regarding a fingerprint authentication method according to an embodiment of the disclosure.

Referring to FIG. 8E, an electronic device according to various embodiments may obtain an image, including fingerprint information, using a bio sensor (e.g., image sensor) at operation 870.

For example, the electronic device may extract a minutia from the obtained image at operation 871. In accordance with another example, the electronic device may perform authentication using the obtained image and at least one template without a separate operation of extracting a minutia from the obtained image, such as operation 871.

In accordance with various embodiments of the disclosure, the electronic device may determine quality of the image using at least one of the obtained image or the obtained minutia at operation 872. For example, the electronic device may quantify the degree of a black and white distribution of the image using a method, such as Standard deviation, in order to determine the quality of the image, and may determine the quality index of the image based on the quantified value.

In accordance with various embodiments of the disclosure, the electronic device may perform fingerprint recognition using a template corresponding to the quality (or quality index) of the image at operation 873.

For example, if it is determined that the quality index of the image corresponds to #3, the electronic device may perform fingerprint recognition using a template generated from an image having quality corresponding to the quality index #3.

The electronic device may determine whether authentication using the template corresponding to the quality index of the image is successful at operation 874.

For example, if, as a result of the execution of the fingerprint authentication for the image based on the template corresponding to the quality index of the image, it is determined that the authentication is successful at operation 876, the electronic device may execute a function corresponding to the authentication success at operation 878. For example, the function corresponding to the authentication success may include a function of permitting access to a given function.

For example, the electronic device may perform fingerprint recognition by determining whether the image corresponds to the remaining templates other than the template corresponding to the quality index at operation 875.

For example, the electronic device may execute a corresponding function based on a result of the execution of authentication based on the remaining templates at operation 877 and operation 878.

In accordance with various embodiments of the disclosure, an electronic device may store at least one template in memory. For example, the electronic device can minimize the time taken for the authentication of the electronic device by preferentially performing fingerprint authentication for comparing templates generated from images having quality identical with or similar to quality corresponding to quality of an image used for authentication.

Figure 9A:
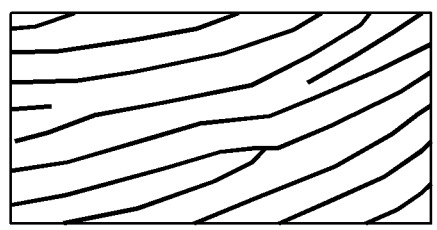
FIGS. 9A and 9B are diagrams illustrating a method of determining quality of an image according to various embodiments of the disclosure.
Figure 9A:
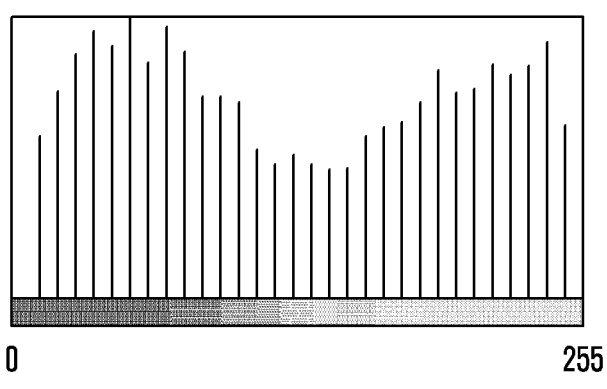
Figure 9B:
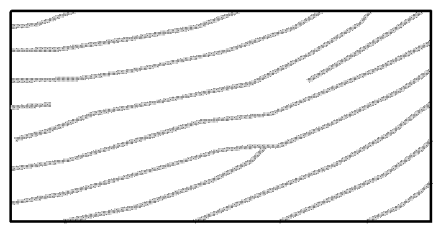
Figure 9B:
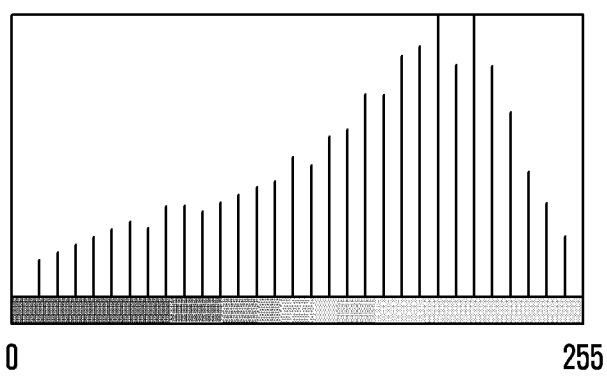

FIGS. 9A and 9B are diagrams illustrating a method of determining quality of an image according to various embodiments of the disclosure.

In accordance with various embodiments of the disclosure, an electronic device may identify the degree of a black and white distribution of an image based on information included in the image quality of which is to be determined.

Referring to FIG. 9A, it may be seen that a proportion of an area belonging to areas forming the image and including black and a proportion of an area belonging to the areas forming the image and including white is relatively greater than a proportion of an area including a middle color.

For example, if black and white of colors forming an image are more distributed than other middle colors, a quality index may be determined to be relatively high because it is easy to determine a bent form of a fingerprint based on the image.

Referring to FIG. 9B, it may be seen that a proportion of an area belonging to areas forming the image and including white is greater than a proportion of an area belonging to the areas forming the image and including black.

For example, if white of colors forming an image is more distributed than black of the colors, it may be difficult to determine a bent form of a fingerprint based on the image because the ridge area and valley area of the fingerprint are not clear. For example, the quality index of the image shown in FIG. 9B may be determined to be relatively low.

In accordance with various embodiments of the disclosure, an electronic device may quantify the degree of a black and white distribution of an image using a method, such as Standard deviation.

For example, a Standard deviation size obtained based on the degree of a black and white distribution of the image of FIG. 9A may be greater than a Standard deviation size obtained based on the degree of a black and white distribution of the image of FIG. 9B. For example, an electronic device may determine the quality index of an image based on a value obtained by quantifying the degree of a black and white distribution of the image.

Figure 9C:
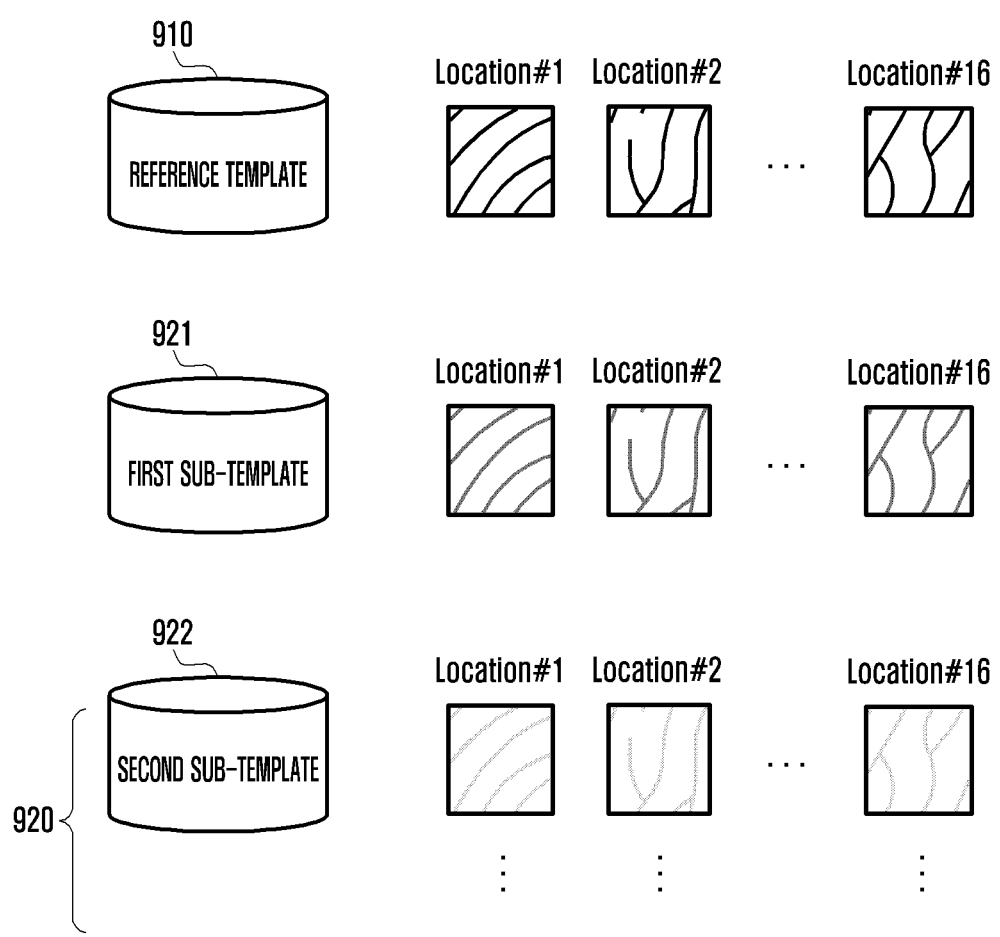
FIG. 9C illustrates at least one template according to an embodiment of the disclosure.

FIG. 9C illustrates at least one template according to an embodiment of the disclosure.

Referring to FIG. 9C, in accordance with various embodiments of the disclosure, an electronic device may store at least one template in memory. For example, the at least one template may include a reference template 910 and one or more sub-templates 920 (e.g., a first sub-template 921 and a second sub-template 922).

In accordance with various embodiments of the disclosure, the reference template 910 may mean a template used for authentication over other templates stored in memory when fingerprint authentication is performed using a first image obtained by an image sensor and a second image generated by processing the first image in a fingerprint authentication operation.

In accordance with various embodiments of the disclosure, the reference template 910 may be updated through a quality comparison with other additional templates generated from an additionally obtained image and stored in memory in a fingerprint authentication operation or fingerprint registration operation performed after the reference template 910 is generated.

For example, the reference template 910 may be updated with a template having the highest quality index compared to other templates (e.g., one or more sub-templates 921 and 922). For example, the template having the highest quality index may mean a template input in the state in which a fingerprint corresponding to an image used to generate a template includes a relatively lot of moisture. For example, a template having a high quality index may mean a template having a low missrecognition rate in fingerprint recognition performed based on the template.

In accordance with various embodiments of the disclosure, an electronic device may classify one or more sub-templates into sub-templates respectively corresponding to qualities in accordance with qualities of images used to generate respective templates. As shown in FIG. 9C, the templates may include a plurality of sub-images classified according to fingerprint areas. In accordance with an embodiment of the disclosure, unlike in FIG. 9C, the templates may have a form of a single image which may be obtained by stitching sub-images.

In accordance with various embodiments of the disclosure, an electronic device may generate an additional template based on the additionally obtained image, may substitute at least some of previously stored templates with at least some of the additional template through a quality comparison with the templates previously stored in memory or add at least some of the additional template to at least some of the previously stored templates, and may store them.

For example, if the update of the template has been performed using an image obtained in a fingerprint authentication operation, the electronic device may update at least some of a template used for the authentication of the image using the image.

Figure 10:
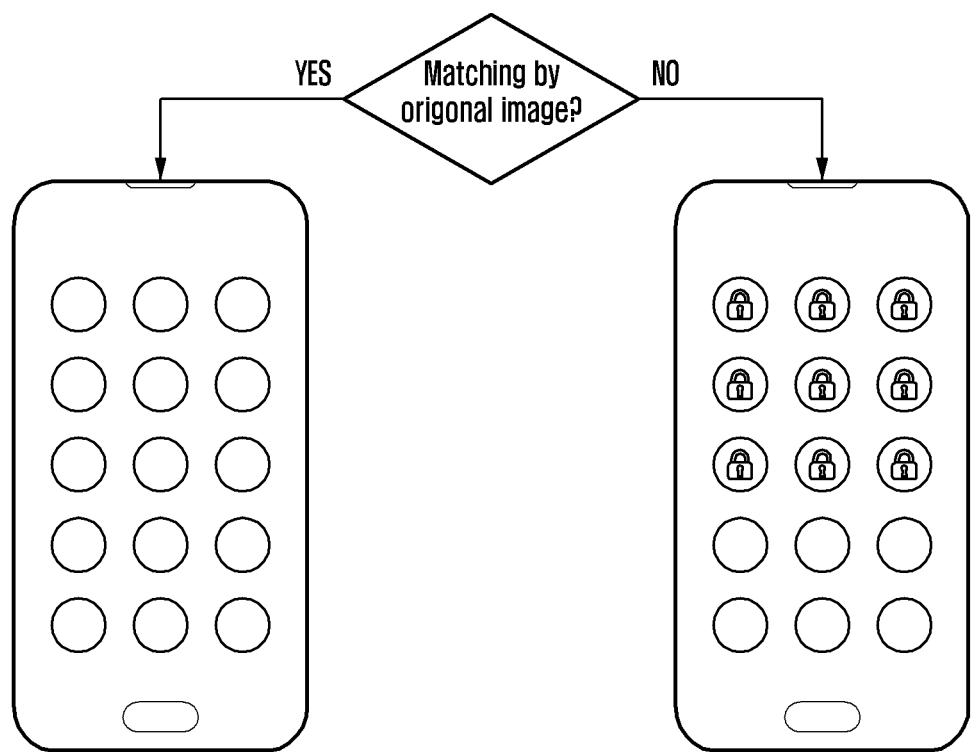
FIG. 10 is a diagram illustrating a degree that a function is provided for each authentication method in an electronic device according to an embodiment of the disclosure.

FIG. 10 is a diagram illustrating a degree that a function is provided for each authentication method in an electronic device according to an embodiment of the disclosure.

Referring to FIG. 10, an electronic device according to various embodiments may permit access to a given function based on a result of fingerprint authentication.

For example, a template stored in the memory of an electronic device may include a first template generated from the original image and a second template generated from a processing image obtained by performing processing on the original image.

In accordance with various embodiments of the disclosure, the electronic device may limit at least some of a function to which access is permitted when the fingerprint authentication is successful depending on whether the template has been generated from the original image or a processed image.

For example, when authentication for an image is successful based on the first template generated from the original image in a fingerprint authentication operation, the electronic device may permit access to all of functions corresponding to the authentication success.

For another example, when authentication for an image is successful based on the second template generated from the processed image in a fingerprint authentication operation, the electronic device may permit access to at least some of functions corresponding to the authentication success and may limit access to some functions based on a preset reference.

In accordance with an embodiment of the disclosure, when an image used for fingerprint recognition in a fingerprint authentication operation is not a first image obtained by an image sensor, an electronic device may limit at least some of a function to which access is permitted when the fingerprint authentication is successful depending on whether the image used for the fingerprint recognition is a second image obtained by processing the image obtained by the image sensor.

For example, when authentication is successful based on at least one template using a first image obtained by an image sensor in a fingerprint authentication operation, an electronic device may permit access to all of functions corresponding to the authentication success.

For another example, when authentication is successful using a second image generated through the processing of a first image other than the first image directly obtained by an image sensor in a fingerprint authentication operation, an electronic device permits access to at least some of functions corresponding to the authentication success, but may limit access to some functions.

In accordance with various embodiments of the disclosure, an electronic device may differentially provide a security level through a given authentication method although authentication is successful by taking into consideration the possibility that fingerprint recognition will be successful due to missrecognition.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

The electronic device according to various embodiments can provide enhanced fingerprint recognition performance through which a fingerprint can be precisely recognized without being limited to an environment, such as whether the state of a fingerprint is dry.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device comprising:
a transparent member;
a display positioned under the transparent member and comprising a plurality of pixels;
an image sensor positioned under at least part of the display;
a memory configured to store at least one template; and
at least one processor configured to:
obtain a first image based on light output through at least some of the plurality of pixels and reflected by an external object coming into contact with the transparent member using the image sensor and perform authentication on the external object based on the at least one template using the first image, and
generate a second image of the external object based on the first image when a quality of the first image corresponds to a given condition based on a result of the authentication and perform authentication on the external object based on the at least one template using the second image.

2. The electronic device of claim 1, wherein the at least one processor is further configured to:
determine whether the quality of the first image is at least a first reference value, and
determine whether the quality of the first image is at least a second reference value when the quality of the first image is less than the first reference value.

3. The electronic device of claim 2, wherein the at least one processor is further configured to:
when the quality of the first image is at least the second reference value, generate the second image and perform the authentication of the external object using the second image, and
when the quality of the first image is less than the second reference value, change a setting of at least one of the plurality of pixels or the image sensor and obtain a third image of the external object using the image sensor based on the changed setting.

4. The electronic device of claim 1, wherein the at least one processor is further configured to:
permit access to a function corresponding to an authentication success when the authentication of the external object performed using the first image is successful, and
permit access to a plurality of functions corresponding to the authentication success when the authentication of the external object performed using the second image is successful.

5. The electronic device of claim 1, wherein the at least one processor is further configured to:
generate an additional template based on the first image when the authentication of the external object performed using the second image is successful, and
store the generated additional template in the memory.

6. The electronic device of claim 1, wherein the at least one processor is further configured to generate the second image of the external object using at least one of a normalization method, a contrast enhancement method, a bandpass filter, or a Garbor filter, based on the first image when the quality of the first image corresponds to the given condition.

7. The electronic device of claim 1,
wherein the at least one template comprises a reference template and at least one sub-template, and
wherein the at least one processor is further configured to:
perform the authentication on the external object based on the reference template using at least one of the first image or the second image, and
perform the authentication on the external object based on the at least one sub-template using at least one of the first image or the second image when the authentication of the external object performed using the reference template fails.

8. The electronic device of claim 1, wherein the at least one processor is further configured to determine the quality of the obtained first image using at least one of a local clarity score, an orientation certainty level, a fuzziness, or a standard deviation.

9. The electronic device of claim 1, wherein the at least one processor is further configured to:
before the authentication on the external object is performed, determine the quality of the first image based on information included in the first image,
generate the second image of the external object based on the first image when the quality of the first image corresponds to a given condition, and
perform the authentication on the external object based on the at least one template using at least one of the first image or the second image.

10. The electronic device of claim 9, wherein the at least one processor is further configured to:
determine whether the quality of the first image is at least a first reference value, and
perform the authentication of the external object using the first image when the quality of the first image is at least the first reference value.

11. The electronic device of claim 10, wherein the at least one processor is further configured to:
determine whether the quality of the first image is at least a second reference value when the quality of the first image is less than the first reference value, and
generate the second image when the quality of the first image is at least the second reference value and perform the authentication of the external object using the second image.

12. The electronic device of claim 11, wherein the at least one processor is further configured to:
change a setting of at least one of the plurality of pixels or the image sensor and obtain a third image of the external object using the image sensor based on the changed setting when the quality of the first image is less than the second reference value.

13. The electronic device of claim 9, wherein the at least one processor is further configured to:
generate an additional template based on the first image when the authentication of the external object performed using the second image is successful, and
store the generated additional template in the memory.

14. The electronic device of claim 9,
wherein the at least one template comprises a reference template and at least one sub-template, and
wherein the at least one processor is further configured to:
perform the authentication of the external object based on the reference template using at least one of the first image or the second image, and perform the authentication of the external object based on the at least one sub-template using at least one of the first image or the second image when the authentication of the external object performed using the reference template fails.

15. The electronic device of claim 9, wherein the at least one processor is further configured to:
perform the authentication on the external object based on a template corresponding to the quality of the first image, and
perform the authentication on the external object based on a template other than the template corresponding to the quality of the first image when the authentication based on the template corresponding to the quality of the first image fails.

16. An electronic device comprising:
a fingerprint sensor;
a memory configured to store at least one template for authenticating a fingerprint; and
at least one processor configured to:
obtain a first image of an external object using the fingerprint sensor,
perform authentication on the external object based on the at least one template using the first image, and
update the at least one template through a quality comparison with at least one other template generated from the first image based on a result of the authentication.

17. The electronic device of claim 16, wherein the at least one processor is further configured to update the at least one template with a template having a highest quality index among the at least one other template when the authentication of the external object performed using the first image is successful.

18. An electronic device comprising:
a transparent member;
a display positioned under the transparent member and comprising a plurality of pixels;
an image sensor positioned under at least part of the display;
a memory configured to store at least one template; and
at least one processor configured to:
obtain light output through at least some of the plurality of pixels and reflected by an external object coming into contact with the transparent member using the image sensor,
obtain a first image of the external object based on the reflected light,
determine a quality of the first image based on information included in the first image,
generate a template using the first image when the quality of the first image is at least a first reference value,
determine whether the quality of the first image is at least a second reference value when the quality of the first image is less than the first reference value,
generate a second image of the external object based on the first image and generate a template using the generated second image when the quality of the first image is at least the second reference value, and
store the generated template in the memory.

19. The electronic device of claim 18, wherein the at least one processor is further configured to:
store the generated template in the memory as a reference template when the template is generated using the first image, and
store the generated template in the memory as a sub-template when the template is generated using the second image.

20. The electronic device of claim 19, wherein the at least one processor is further configured to:
obtain light output through at least some of the plurality of pixels and reflected by a second external object coming into contact with the transparent member using the image sensor,
obtain a third image of the second external object based on the reflected light,
perform authentication on the second external object based on the at least one template using the third image,
permit access to a function corresponding to an authentication success when the authentication is successful based on the reference template, and
permit access to a plurality of functions corresponding to the authentication success when the authentication is successful based on the sub-template.

* * * * *